United States Patent [19]

Cockrell, Jr. et al.

[11] Patent Number: 5,342,450

[45] Date of Patent: Aug. 30, 1994

[54] USE OF NONCORROSIVE CHEMICAL COMPOSITION FOR THE REMOVAL OF SOILS ORIGINATING FROM AN ANIMAL OR VEGETABLE SOURCE FROM A STAINLESS STEEL SURFACE

[75] Inventors: John R. Cockrell, Jr.; Gerald E. La Cosse, both of Greensboro; D. Michael Cates, High Point, all of N.C.

[73] Assignee: Kay Chemical Company, Greensboro, N.C.

[21] Appl. No.: 50,989

[22] Filed: Apr. 22, 1993

Related U.S. Application Data

[63] Continuation of Ser. No. 449,329, Dec. 11, 1989, abandoned, which is a continuation of Ser. No. 301,590, Jan. 26, 1989, abandoned.

[51] Int. Cl.$^5$ ............................ B08B 3/08; B08B 3/10
[52] U.S. Cl. ............................ 134/3; 134/19; 134/39; 134/40
[58] Field of Search ............... 252/135, 136, 106; 134/19, 39, 40, 2, 3

[56] References Cited

U.S. PATENT DOCUMENTS

| | | | |
|---|---|---|---|
| 3,150,096 | 9/1964 | Schmidt | 252/106 |
| 3,297,580 | 1/1967 | Pitzer | 252/142 |
| 3,308,065 | 3/1967 | Lesinski | 252/82 |
| 3,829,387 | 8/1979 | Wise et al. | 252/162 |
| 4,056,113 | 11/1977 | Johnson | 134/39 |
| 4,075,121 | 2/1978 | Morton | 252/135 |
| 4,076,653 | 2/1978 | Davies | 252/532 |
| 4,139,486 | 2/1979 | Bailey | 252/135 |
| 4,157,921 | 6/1979 | Baturay | 252/159 |
| 4,228,048 | 10/1980 | Tesdahl | 260/17.4 |
| 4,372,788 | 2/1983 | Lancz | 134/40 |
| 4,382,825 | 5/1983 | McCready | 134/2 |
| 4,390,465 | 6/1983 | Spekman | 252/527 |
| 4,430,128 | 2/1984 | Frenier | 134/3 |
| 4,534,801 | 8/1985 | Matsuoka | 134/19 |
| 4,539,134 | 9/1985 | Martin | 252/135 |
| 4,595,520 | 6/1986 | Heile | 252/160 |
| 4,686,065 | 8/1987 | Bliznik | 134/40 |
| 4,753,755 | 6/1988 | Ganssen | 252/527 |

OTHER PUBLICATIONS

Child et al., "Mastering the art of French Cooking", vol. 1, New York, Alfred A. Knopf, 1961, pp. 11–12.
Heloise, "Hints from Heloise", Avon Books, pp. 220–228, 1980.
The Chemical Formulary, vol. XI, Bennett ed., Chemical Publishing Company, 1961, pp. 316–317.
The Chemical Formulary, vol. XV, Bennett ed., Chemical Publishing Company, 1970, pp. 232–233.
The Chemical Formulary, vol. III, Bennett ed., Chemical Publishing Company, 1936, pp. 334–335.
Chemical and Engineering News, "Oven Cleaners become more sophisticated . . . ", Aug. 23, 1965.

*Primary Examiner*—R. Bruce Breneman
*Assistant Examiner*—Ourmazd S. Ojan
*Attorney, Agent, or Firm*—Finnegan, Henderson, Farabow, Garrett & Dunner

[57] ABSTRACT

A method of removing from a stainless steel surface a difficultly removable soil originating from an animal or vegetable source comprising the step of contacting the soil adhered to the surface with an amount of a noncorrosive chemical composition effective to ultimately essentially chemically remove the soil from at least 51% of the surface. The difficultly removable soils that can be removed by the method of the invention are otherwise ultimately essentially chemically removable from at least 51% of the surface, at the temperature at which the above contacting step is conducted, only by contact with at least one corrosive chemical composition. The method is both safe for the user and highly effective to remove the above-described soils.

51 Claims, 1 Drawing Sheet

*FIG. 1* ns # USE OF NONCORROSIVE CHEMICAL COMPOSITION FOR THE REMOVAL OF SOILS ORIGINATING FROM AN ANIMAL OR VEGETABLE SOURCE FROM A STAINLESS STEEL SURFACE

This application is a continuation of application Ser. No. 07/449,329, filed Dec. 11, 1989, now abandoned, which is a continuation of application Ser. No. 07/301,590, filed Jan. 26, 1989, abandoned.

FIELD OF THE INVENTION

The instant invention provides a method for removing from a stainless steel surface a difficultly removable soil originating from an animal or vegetable source, by contacting the soil with a noncorrosive chemical composition.

The method of the instant invention is particularly suitable during a boil-out process for the removal from stainless steel food fryers of charred animal or vegetable fats, fatty derivatives and other organic deposits from the cooking of food.

BACKGROUND OF THE INVENTION

Removal from stainless steel surfaces of certain soils originating from an animal or vegetable source, such as charred animal or vegetable fats, fatty derivatives and other organic deposits from the cooking of food, has been a vexing problem in industries such as the food preparation industry, where essentially complete cleaning of such surfaces is desirable. In food service establishments, for example, stainless steel cooking surfaces may be found in food fryers which are heated to high temperatures for the cooking of large amounts of food. Soiling matter deposited on these surfaces may consist of a complex mixture of natural fats, fatty derivatives and other organic deposits from the cooking of food. During heating at high temperatures subsequent to deposition, this soiling matter may be converted into a charred, polymeric mass which is difficult to remove and which can comprise complex hydrocarbon chains containing fatty ester groups and ether linkages.

Such difficultly removable soils degrade shortening added for the frying of foods, reducing the useful life of added shortening and negatively affecting food quality and taste. Such soils also decrease the energy efficiency of the frying apparatus, which may become inefficient due to the thermal resistivity of the charred, carbonized buildup.

Removal of difficultly removable soils from food fryers has customarily been accomplished by a process known in the industry as a "boil-out," which typically involves adding an aqueous solution of a cleaner to a fryer, bringing the fryer to an elevated temperature, such as the boiling point of the cleaner, and maintaining the elevated temperature for a given period of time.

Effective removal of this type of soil is a considerable problem which in the past, even with a boil-out process, has required the use of highly corrosive, unsafe cleaners, typically based on highly alkaline caustics such as sodium or potassium hydroxide, sometimes accompanied by laborious scrubbing and/or scraping. The use of these products gives rise to serious hazards to the skin and eyes of the user. Such products may also damage adjacent surfaces, such as paint, aluminum or wood, with which they may inadvertently come into contact.

There has been a need in the industry to replace such dangerous, corrosive cleaners, with safer, noncorrosive products. A few noncorrosive products, such as trisodium phosphate, have been employed in boil-out processes. However, such noncorrosive cleaners have not proven to be adequate substitutes for the corrosive cleaners since, while safer, their cleaning effectiveness against difficultly removable soils is markedly lower.

Until now, therefore, those skilled in the art have been limited to selecting either relatively safe but ineffective cleaners or effective but hazardous cleaners.

SUMMARY OF THE INVENTION

The instant invention provides a novel method of removing from a stainless steel surface difficultly removable soils originating from an animal or vegetable source, which method is both safe and highly effective.

The method involves contacting such soils with an amount of a noncorrosive chemical composition effective to essentially remove them from a substantial portion of the stainless steel surface to which they are attached.

Particularly, the invention provides a method of removing from a stainless steel surface a difficultly removable soil originating from an animal or vegetable source comprising the step of contacting the soil adhered to the surface with an amount of a noncorrosive chemical composition effective to ultimately essentially chemically remove the soil from at least 51% of the surface, the soil being otherwise ultimately essentially chemically removable from at least 51% of the surface, at the temperature at which the contacting step is conducted, only by contact with at least one corrosive chemical composition.

DETAILED DESCRIPTION OF THE INVENTION

The method of the instant invention for removing from a stainless steel surface a difficultly removable soil originating from an animal or vegetable source, such as charred animal or vegetable fats, fatty derivatives and other organic deposits from the cooking of food, comprises the step of contacting the soil adhered thereto with an amount of a noncorrosive chemical composition effective to ultimately essentially chemically remove the soil from at least 51% of the surface.

The term "essentially remove from," as used herein, indicates that the underlying stainless steel surface is visible to the naked eye subsequent to employing the method of the invention. The term "ultimately essentially chemically remove," as used herein, is not meant to exclude (1) enhanced removal of the difficultly removable soil which may be obtained by employing temperatures elevated above room temperature during the contacting step of the method of the invention, including the attendant agitation resulting from use of a liquid at its boiling point as the noncorrosive chemical composition, or (2) the situation where the soil is not immediately removed but is removed after at least one subsequent application of heat, such as by repeated heatings over a period of up to eight weeks.

Preferably, the soil is ultimately essentially chemically removed from at least 60%, more preferably from at least 60-70%, and most preferably from at least 75%, of the stainless steel surface.

The difficultly removable soils that can be removed by the method of the invention are otherwise ultimately essentially chemically removable from at least 51% of the surface, at the temperature at which the above contacting step is conducted, only by contact with at least one corrosive chemical composition. The inventors are aware of circumstances where any one corrosive chemical composition may not remove the difficultly removable soil from the desired amount of surface area, but another corrosive chemical composition, either alone or in combination with the first corrosive chemical composition, will remove the soil. A commercially available corrosive chemical composition which is capable of removing desired amounts of almost all difficultly removable soils is an aqueous 40 weight % solution of potassium hydroxide, which may be diluted in about a 2:5 volume ratio with a liquid such as water (that is, two volume parts of aqueous 40 weight % potassium hydroxide solution to five volume parts of water), yielding an aqueous 10–11 weight % solution of potassium hydroxide for use in removing such soils.

The term "corrosive," as used herein, denotes a composition having a corrosive effect on human skin tissue, as defined by the Department of Transportation, Title 49, Code of Federal Regulations, Chapter 1, Subpart E, § 173.240, incorporated herein by reference. That is, "a corrosive material is a liquid or solid that causes visible destruction or irreversible alterations in human skin tissue at the site of contact . . . A material is considered to be destructive or to cause irreversible alteration in human skin tissue if when tested on the intact skin of the albino rabbit by the technique described in Title 21, Code of Federal Regulations, § 191.11, the structure of the tissue at the site of contact is destroyed or changed irreversibly after an exposure period of 4 hours or less . . . " A "noncorrosive chemical composition" is one which is not corrosive, as corrosive is defined according to the previous definition.

In one embodiment of the invention, the noncorrosive chemical composition employed is also noncorrosive to the human eye, as such noncorrosivity is defined in the Hazardous Substance Labeling Act, Code of Federal Regulations 16, Part 1500.42.

The method of the invention is especially useful in removing the above-described soils from deep fat fryers having stainless steel interiors during a boil-out process, but is also useful for cleaning other stainless steel surfaces, particularly other stainless steel heated surfaces used in food preparation environments to cook food, particularly foods which leave fatty or greasy residues as they cook.

Preferred noncorrosive chemical compositions to be employed in the method of the invention comprise at least one compound selected from the group consisting of:

(i) a chelating or sequestering agent;
(ii) an acidic agent; and
(iii) an alkaline agent, with the proviso that, when the alkaline agent is an alkali metal phosphate, it is used in combination with at least one of a chelating or sequestering agent, an acidic agent, and an alkaline agent other than the alkali metal phosphate.

A particularly preferred noncorrosive chemical composition comprises water and at least one of (i) through (iii) above.

Concentrations of the components of the noncorrosive chemical composition are preferably selected to obtain a composition which is stable over an extended period of time. The composition may suitably take a liquid form, such as a solution or slurry, or a solid or semi-solid form, such as a paste or powder.

The components of the preferred noncorrosive chemical composition will now be described in more detail. Preferably, the noncorrosive chemical composition is a liquid concentrate which is diluted prior to or during the contacting step of the invention. Thus, the following preferred amounts of the components of the noncorrosive chemical composition are those amounts employed in a liquid concentrate, based on the total weight of the liquid concentrate. Other forms of the noncorrosive chemical composition, such as a powder, may typically contain up to 100% by weight of any of the above components (i) through (iii). In all forms of the noncorrosive chemical composition—liquid, semi-solid or solid—the preferred relative amounts of the components of the composition correspond to the preferred relative amounts of those components indicated for the liquid concentrate below.

A particularly preferred embodiment of the invention involves the use of a noncorrosive chemical composition in aqueous liquid concentrate form which is then diluted with a liquid such as water, most preferably water above room temperature, prior to or during the contacting step. For example, in cleaning a food fryer having a liquid fill volume of seven gallons, two gallons of an aqueous liquid concentrate of the noncorrosive chemical composition can be added to the fryer, which can then be diluted by the addition of five gallons of water, preferably heated water. The seven gallons of diluted liquid may be used as is during a boil-out process. The volume ratio of aqueous liquid concentrate to added water may be varied as desired. The total volume may, of course, be adjusted to adequately cover the surface to be cleaned.

When a chelating or sequestering agent is employed in the noncorrosive chemical composition of the method of the invention, this agent is preferably at least one salt selected from the group consisting of ammonium, amine, such as hydroxyalkylamine, and alkali metal salts of an acid selected from the group consisting of alkylenepolyaminepolycarboxylic acids, nitrilotriacetic acid, gluconic acid and N-2 hydroxyethylaminodiacetic acid. The ammonium sodium and potassium salts of these acids are particularly preferred.

Especially preferred are the salts of alkylenepolyaminepolycarboxylic acids, most preferably the salts of acids having the following formula:

where x and y are each independently a number from 1 to 4 and R is selected from methyl, ethyl, propyl and isopropyl groups, and where up to x of the carboxyalkyl groups may be replaced by beta-hydroxyethyl groups. Exemplary such acids include ethylenediaminetetraacetic acid, N-(hydroxyethyl)ethylenediaminetriacetic acid, ethylenetriaminepentacetic acid, propylene-1,2-diaminetetraacetic acid, propylene-1,3-diaminetetraacetic acid, and the isomeric butylenediaminetetraacetic acids. Of these, ethylenediaminetetraacetic acid and N-(hydroxyethyl)ethylenediaminetriacetic acid are most preferred. The alkali metal salts, particularly the tetrasodium salt, of ethylemediaminetetraacetic acid provide excellent results when employed as the chelating or sequestering agent in the noncorrosive chemical composition of the method of the invention.

Preferred amounts of the chelating or sequestering agent which can be contained in the noncorrosive chemical composition employed in the method of the invention range up to about 60 weight percent, more preferably from about 0.5 to 60 weight percent, even more preferably from about 3 to 50 weight percent, and most preferably from about 3 to 12 weight percent for a liquid concentrate.

When an acidic agent is employed in the noncorrosive chemical composition of the method of the invention, the acid therein may be either inorganic or organic. Exemplary acidic agents include those containing at least one acid selected from the group consisting of sulfamic, maleic, sulfuric, nitric, hydrochloric, phosphoric, citric, acetic, tartaric, gluconic and hydroxyacetic acids. Phosphoric acid is especially preferred.

Preferred amounts of the acidic agent which can be contained in the noncorrosive chemical composition employed in the method of the invention range up to about 40 weight percent, more preferably from about 0.1 to 25 weight percent, and most preferably from about 1 to 10 weight percent for a liquid concentrate.

The acidic agent can be present in an amount such that the noncorrosive chemical composition has an acid pH.

When an alkaline agent is employed in the noncorrosive chemical composition of the method of the invention, the alkaline compound therein is preferably at least one compound selected from the group consisting of alkali metal carbonates, alkali metal bicarbonates, alkali metal phosphates, alkali metal hydroxides and alkali metal silicates. Especially preferred are the alkali metal hydroxides, such as potassium hydroxide, and the alkali metal silicates, such as sodium metasilicate pentahydrate. The alkali metal phosphates, such as tripotassium phosphate, should be used in combination with at least one of an acidic agent, a chelating or sequestering agent and an alkaline agent other than an alkali metal phosphate.

Preferred amounts of the alkaline agent which may be contained in the noncorrosive chemical composition employed in the method of the invention range up to about 40 weight percent, more preferably from about 0.1 to 25 weight percent, and most preferably from about 1 to 10 weight percent for a liquid concentrate. When a strong base is used, such as an alkali metal hydroxide, in the noncorrosive chemical composition, the amount is preferably limited to less than about 1% by weight for improved safety and noncorrosivity to the human skin.

The composition of the invention preferably contains one, two or all three of the above-described ingredients (i) through (iii). Preferably, the composition contains more than one ingredient and, most preferably, these ingredients include at least one chelating agent and at least one alkaline agent.

The effectiveness of the noncorrosive chemical composition employed in the method of the invention may be enhanced by further adding at least one surfactant. Such surfactants may be zwitterionic, cationic, anionic or nonionic in nature. A mixture of surfactants of the same or different natures may also be employed.

When an anionic surfactant is employed, it preferably includes at least one compound selected from the group consisting of soaps and the water-soluble salts of the following compounds: alkylbenzene sulfonates, alkyl sulfates, alkylpolyethoxyether sulfates, paraffin sulfonates, alpha-olefin sulfonates, alpha-sulfocarboxylates and their esters, alkylglycerylethersulfonates, fatty acid monoglyceride-sulfates and -sulfonates, alkylphenolpolyethoxy ethersulfates, 2-acyloxy-alkane-1-sulfonates and beta-alkyloxy alkanesulfonates.

Further, when an anionic surfactant is employed, it is especially preferred to use at least one compound selected from the group consisting of soaps having from about 8 to 24 carbon atoms, more preferably from about 12 to 18 carbon atoms, and the water-soluble salts of the following compounds: alkylbenzenesulfonates having from about 9 to about 15 carbon atoms in a linear or branched alkyl chain, more preferably from about 11 to about 13 carbon atoms in a linear or branched alkyl chain; alkylsulfates having from about 8 to about 22 carbon atoms in the alkyl chain, more preferably from about 12 to about 18 carbon atoms in the alkyl chain; alkylpolyethoxy ethersulfates having from about 10 to about 18 carbon atoms in the alkyl chain and an average of from about 1 to about 12 —$CH_2CH_2O$— groups per molecule, more preferably from about 10 to about 16 carbon atoms in the alkyl chain and an average of from about 1 to about 6 —$CH_2CH_2O$— groups per molecule; linear paraffin sulfonates having from about 8 to about 24 carbon atoms, more preferably from about 14 to about 18 carbon atoms; and alpha-olefin sulfonates having from about 10 to about 24 carbon atoms, more preferably from about 14 to about 16 carbon atoms.

When one of the above-listed water soluble salts is used, the cation of the salt is preferably an alkali metal, alkaline earth metal, ammonium or alkanolamine cation.

When a nonionic surfactant is employed, it preferably includes at least one compound selected from water-soluble polyethoxy compounds having the structure of polyethoxy compounds produced by the condensation of ethylene oxide with a hydrophobic compound, the hydrophobic compound preferably being an alcohol, such as an aliphatic alcohol, an alkyl phenol, or polypropoxy glycol, or polypropoxy ethylenediamine. The corresponding polypropoxy compounds may also be employed.

Especially preferred are polyethoxy surfactants having the structure of polyethoxy alcohols produced by the condensation of ethylene oxide with a branched or straight chain, primary or secondary aliphatic alcohol having from about 8 to about 22 carbon atoms. Such nonionic surfactants may be produced, for example, by condensing an average of from about 1 to about 30 moles, preferably from about 1 to about 6 moles, of ethylene oxide with about 1 mole of a branched or straight chain, primary or secondary aliphatic alcohol having from about 8 to about 22, preferably from about 9 to about 16, carbon atoms.

Ethoxylated fatty alcohols having the following structure, and mixtures thereof, provide excellent results when employed as a surfactant in the noncorrosive chemical composition:

$$R(OCH_2CH_2)_xOH$$

where R is an aliphatic hydrocarbon group having from about 8 to 20 carbon atoms, and x the average degree of ethoxylation and is a number from about 1 to 10. An especially preferred surfactant is a mixture of two such ethoxylated fatty alcohol surfactants, where each surfactant has an R group of from about 9 to 11 carbon atoms, and where the value of x in one of the ethoxylated fatty alcohols is approximately 2.5 and the value of x in the other of the ethoxylated fatty alcohols is approximately 6.0. Certain species of polyethoxy alcohol surfactants are commercially available under the tradenames of "Neodol" ® and "Tergitol" ®.

When a zwitterionic surfactant is employed, it preferably includes at least one compound selected from the group consisting of the water-soluble derivatives of aliphatic quaternary ammonium, phosphonium and sulfonium cationic compounds in which the aliphatic moieties are straight or branched, and where at least one of the aliphatic moieties contains from about 8 to 18 carbon atoms and at least one of the aliphatic moieties contains an anionic water-solubilizing group. The anionic water-solubilizing group is preferably selected from the alkyldimethyl-propanesulfonates and alkyldimethyl-ammoniohydroxy-propane-sulfonates, where the alkyl groups therein contain from about 1 to 18 carbon atoms.

When a cationic surfactant is employed, it preferably includes at least one quaternary ammonium compound, such as cetyltrimethylammonium bromide or chloride, distearyldimethylammonium bromide or chloride, or other fatty alkyl quaternary ammonium compounds.

A typical listing of the classes and species of surfactants expected to be useful in this invention appear in the books "Surface Active Agents," Vol. I, by Schwartz & Perry (Interscience 1949) and "Surface Active Agents," Vol. II, by Schwarz, Perry & Berch (Interscience 1958), the disclosures of which are incorporated herein by reference. The listing, and the foregoing recitation of specific surfactant compounds and mixtures which may be used in the noncorrosive chemical compositions employed in the invention method, are representative but are not intended to be limiting.

When one or more surfactants are used in the noncorrosive chemical composition employed in the method of the invention, the total amount of surfactant preferably ranges up to about 60 weight percent, more preferably from about 1 to 60 weight percent, and most preferably from about 3 to 15 weight percent for a liquid concentrate.

The selection of which type surfactant is to be used with the combination of one or more of ingredients (i) through (iii) discussed above is not believed to be critical. However, in one particularly preferred embodiment, the composition of the invention comprises a chelating agent, an alkaline agent and a nonionic surfactant.

Perfumes and dyes may optionally be added to the noncorrosive chemical composition employed, as well as other ingredients known to those in the cleaning art which may enhance the effectiveness or marketability of the noncorrosive chemical composition.

Perfumes, such as those imparting a sassafras odor, are desirable particularly when the noncorrosive chemical composition is employed in a contacting step involving a boil-out, as the odor of the composition employed may fill the work area. Preferable amounts of perfume which may be contained in the noncorrosive chemical composition range up to about 4 weight percent, more preferably from about 0.1 to 2 weight percent, and most preferably from about 0.1 to 0.3 weight percent for a liquid concentrate.

Dyes are desirable to assist the user in distinguishing the noncorrosive chemical composition from other cleaning products and from water and other liquids such as beverages, for safety reasons. The use of a dye in the noncorrosive chemical composition may also promote the commercial appeal of the product. Examples of suitable dyes include FD&C Blue #1, FD&C Yellow #6, FD&C Red #3, FD&C Green #3, FD&C Yellow #5 and mixtures thereof. Preferable amounts of dye which can be contained in the noncorrosive chemical composition employed range up to about 0.5 weight percent, more preferably from about 0.00005 to 0.0004 weight percent, and most preferably from about 0.0001 to 0.0003 weight percent for a liquid concentrate.

Figure 1:
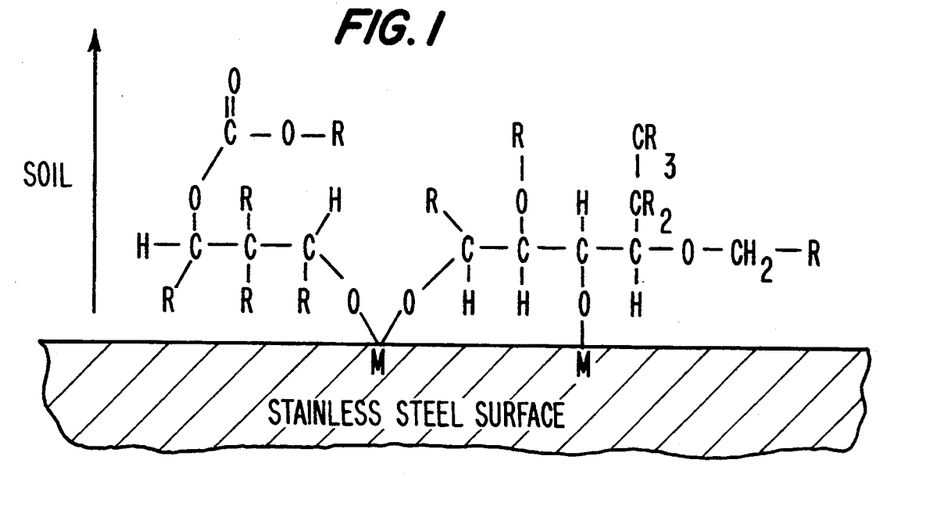
FIG. 1 is a vertical sectional view provided to illustrate the theoretical attachment of a polymeric, difficultly removable soil originating from an animal or vegetable source, such as a charred animal or vegetable fat, fatty derivative or other organic deposit from the cooking of food, to a stainless steel surface. Analysis by x-ray photoelectron spectroscopy of actual soil samples has suggested that such a soil typically comprises a complex, polymeric hydrocarbon matrix containing oxygen atoms in fatty ester groups and ether linkages. It should be emphasized, however, that the claimed invention is to be in no way constrained by this explanation.

The following has been hypothesized as an explanation for the effectiveness of the method of the invention. It should be emphasized, however, that the invention is to be in no way constrained by this explanation. FIG. 1 is provided to illustrate the theoretical attachment of a difficulty removable soil originating from an animal or vegetable source, such as a charred animal or vegetable fat, fatty derivative or other organic deposit from the cooking of food, to a stainless steel surface. Analysis by X-ray photoelectron spectroscopy of actual soil samples has suggested that the soil comprises a complex, polymeric hydrocarbon matrix, containing oxygen atoms in fatty ester groups and ether linkages.

As indicated in FIG. 1, such soils are thought to be bonded to the stainless steel surface in part through oxygen atoms to the metal atoms found on the surface of the stainless steel surface in the unsoiled state. Metal atoms present on the surface of unsoiled stainless steel include, for example, iron, chromium and nickel atoms. The polymeric chains of the soil matrix may also be trapped in interstices in the stainless steel surface itself or become entangled with other soil polymer chains held close to the stainless steel surface by the above-described metal-oxygen bonds.

The different agents of the noncorrosive chemical composition of the method of the invention may remove the adhered soil through a number of different mechanisms, such as (a) by disrupting the bonds between the stainless steel surface and the soil and/or (b) by breaking down the soil matrix, either physically or chemically. For example, a chelating or sequestering agent, or an acidic agent, may remove such soils by disrupting the bonds between the stainless steel surface and the soil matrix. The bonds disrupted may be either the carbon-oxygen bonds or the metal-oxygen bonds.

In addition to disrupting the bonds attaching the soil to the stainless steel surface, an alkaline agent may also chemically break down the soil matrix. Such action may preferably be achieved by employing alkaline agents capable of at least partially saponifying the fatty ester groups of the soil matrix, such as those alkaline agents supplying a source of hydroxyl ions. Removal of fats, particularly soft fats, such as by saponification of a portion of the fatty ester groups, embrittles the soil matrix so that, if heat is later applied, for example, during the removal process itself or during subsequent cooking wherein heat is applied to the outside surface of the stainless steel, the difference between the coefficient of thermal expansion of the stainless steel and that of the embrittled soil matrix may result in a gross breakdown of the soil matrix. This gross breakdown may be observable as chunks of soil released from the stainless steel surface during, or subsequent to, the contacting step of the invention, such as during or after the use of a boil-out process.

Addition of a surfactant to the noncorrosive composition may facilitate removal of the soil from the stainless steel surface by the detergent action of the surfactant on the soil matrix. Surfactants possessing long chain aliphatic groups, for example, may be particularly effective in breaking down the soil matrix. This type of breakdown is thought to occur by a mechanism which involves the attraction of the polymeric hydrocarbon chains of the soil matrix to the long chain aliphatic groups of the surfactant, resulting in an expanding and opening of the soil layer.

The surfactant also acts as a wetting agent. In this capacity, the surfactant can facilitate the diffusion of the chelating or sequestering, acidic or alkaline agent to the point where the soil is physically or chemically bound to the stainless steel surface, and to fatty ester groups in the case where alkaline agents capable of saponifying those groups are employed. The surfactant allows faster and more complete action of these agents in disrupting the chemical bonds binding the soil to the metal atoms of the stainless steel surface and/or physically breaking down the polymerized soil matrix.

The method of contacting the noncorrosive chemical composition with the soil to be removed may be selected by those skilled in the art. A particularly preferred method of the invention comprises the use of aqueous liquids as the noncorrosive chemical composition. Any suitable method for handling the composition in liquid form may be employed, such as spraying or pouring, so that an effective amount of the noncorrosive chemical composition is in contact with the difficulty removable soil adhered to the surface. A preferred such method comprises pouring a liquid noncorrosive chemical composition directly onto the soil to be removed. A concentrated liquid, for example, may be poured directly into a stainless steel fryer, if desired, with subsequent dilution of the composition in situ, as described above.

When the composition of the invention is in a solid or semi-solid form, such as a paste or powder, it is typically mixed with a liquid which acts to dissolve at least a portion of the composition, such as water. The amount of the liquid is usually selected so that the relative proportions of the various ingredients in the resulting solution or slurry will approximate the proportions described for the composition in liquid concentrate form, as described above.

The noncorrosive chemical composition to be employed may be prepared by any suitable means known to those skilled in the art. The components of the noncorrosive chemical composition may, for example, be mixed in any order which is convenient for preparation.

The temperature at which the contacting step is conducted preferably ranges from room temperature to the boiling point of the noncorrosive chemical composition, and is most preferably the boiling point of the noncorrosive chemical composition. Means for agitation and abrasion may be employed concurrent with, or subsequent to, the contacting step to facilitate removal of the difficultly removable soil from the stainless steel surface. The method of the invention, however, can provide an improvement over previously employed noncorrosive compositions in that, by employing an effective amount thereof, difficultly removable soil may be removed from at least 51% of the stainless steel surface to which it is adhered without, for example, use of means for abrasion, and without the use of a corrosive chemical composition.

Suitable means for abrasion to physically remove any remaining difficultly removable soil typically include a sharp edged tool, such as a razor blade or putty knife, an abrasive pad, and scouring powder.

Abrasive pads may be used manually to provide sufficient abrasive action to remove the difficultly removable soil and may, for example, be based on fine particles of silicon carbide or aluminum oxide. Abrasive pads particularly well-suited comprise a lofty three-dimensional web of organic resinous fibers which are coated with silicon carbide or aluminum oxide abrasive particles. Preferred aluminum oxide pads are commercially available, for example, from the American Manufacturing Co. of Acworth, Georgia. Preferred silicon carbide pads are commercially available, for example, from the 3M Company of St. Paul, Minn.

Abrasive means other than the manual means are also contemplated, for example, scrubbing machines having abrasive brushes or pads (for example, a nylon brush having embedded silicon carbide or aluminum oxide).

Means for agitation may include the boiling action of the noncorrosive chemical composition, when such a composition is a liquid employed at its boiling point during the contacting step of the invention. Particularly, soil removal is enhanced by employing an aqueous noncorrosive chemical composition at its boiling point. As liquid water diffuses through the polymerized soil matrix towards the heated stainless steel surface, it is vaporized. The steam bubbles so formed act to break up the soil and to force the soil from the heated surface.

Particularly preferred formulations of the noncorrosive chemical composition to be employed in the method of the invention will now be described. Such particularly preferred noncorrosive chemical compositions include those compositions comprising at least one chelating or sequestering agent, at least one alkaline agent, and at least one surfactant. Especially preferred noncorrosive chemical compositions are those which comprise at least one chelating or sequestering agent, at least one alkaline agent capable of at least partially saponifying fatty ester groups, and at least one surfactant, particularly in aqueous liquid form.

The following are exemplary, non-limiting formulations of noncorrosive chemical compositions particularly suitable for use in the invention. These formulations are especially useful in removing difficultly removable soil, adhered to the stainless steel surface of a food fryer, during a boil-out process. The parts by weight shown are suggested, and may be varied by those skilled in the art.

| Component | Parts by Weight |
|---|---|
| Exemplary Formulation No. 1 (Aqueous Liquid Concentrate)[1] | |
| (a) tetrasodium ethylenediaminetetraacetate (39% in water) | 16.7 |
| (b) sodium xylene sulfonate (40% in water) | 18.5 |
| (c) phosphoric acid (75% in water)[2] | 5.5 |
| (d) potassium hydroxide (40% in water)[2] | 14.9 |

-continued

| Component | Parts by Weight |
|---|---|
| (e) sodium metasilicate pentahydrate | 0.46 |
| (f) Neodol ® 91-6[3] | 2.8 |
| (g) Neodol ® 91-2.5[4] | 2.8 |
| (h) perfume | 0.15 |
| (i) dye | 0.0002 |
| (j) water | 37.9 |
| Exemplary Formulation No. 2 (Powder/Slurry)[5] | |
| (a) tetrasodium ethylenediamine-tetraacetate | 29.48 |
| (b) tripotassium phosphate | 40.95 |
| (c) potassium hydroxide | 1.44 |
| (d) sodium metasilicate pentahydrate | 2.09 |
| (e) Neodol ® 91-2.5 | 12.68 |
| (f) Neodol ® 91-6 | 12.68 |
| (g) perfume | 0.68 |

[1] For use in the contacting step of the invention, Exemplary Formulation No. 1 is preferably diluted with water in a volume ratio of 2 parts liquid aqueous concentrate to 5 parts water.
[2] The combination of (c) phosphoric acid and (d) potassium hydroxide may form tripotassium phosphate in situ.
[3] Tradename of an ethoxylated fatty alcohol surfactant having the formula: $R(OCH_2CH_2)_xOH$ where R is an aliphatic hydrocarbon group having from about 9 to 11 carbon atoms, and where the value of x, where x is the average degree of ethoxylation in the ethoxylated fatty alcohol, is approximately 6.0.
[4] Tradename of an ethoxylated fatty alcohol surfactant having the same formula and R group shown above for Neodol ® 91-6 except that the value of x is approximately 2.5.
[5] For use in the contacting step of the invention, Exemplary Formulation No. 2 is preferably diluted with water to a final concentration of approximately 0.8 lb solids per gallon of water.

Fryer Boil-Out Process

As indicated above, the method of the invention is particularly advantageous in removing difficultly removable charred or carbonized animal or vegetable fats, fatty derivatives and other organic deposits from the cooking of food from the stainless steel surfaces of a food fryer in a cleaning process known as a boil-out process. Typically, such fryers may have one or more "hot" stainless steel surfaces which may be heavily soiled with such difficultly removable soils.

A boil-out procedure, employing a preferred embodiment of the method of the invention, typically comprises the steps of:

(1) draining any shortening present in the fryer;

(2) closing the drain valve and adding the noncorrosive chemical composition of the method of invention, for example, either of Formulation Nos. 1 or 2 above;

(3) filling the remaining volume of the fryer, to the shortening fill line, with hot water;

(4) slowly bringing the fryer to a boil;

(5) allowing the liquid to boil for approximately 1 hour;

(6) adding water as needed during the boil-out process to maintain the liquid level at the shortening fill line;

(7) after about 1 hour, adding sufficient cold water to the soiled liquid to cool it, preferably to a temperature of approximately 160° F. or lower;

(8) draining the cooled, soiled solution out of the fryer; and (9) adding shortening, skimming any additional soil apparent in the shortening upon heating thereof.

During step (5) (boiling for about an hour), it is advantageous, but not usually necessary, to use a long-handled, heat-resistant pot brush to brush the liquid containing the composition onto the area above the liquid level to remove soil from the upper portion of the fryer. Further, between steps (8) and (9), it may be advantageous, but is not necessary, to add additional cool water to the fryer and to use an abrasive, such as a scouring pad, to remove any loosened soil from the fryer. The resulting soiled liquid should be drained and discarded. The use of an abrasive may be repeated, if desired. After the use of any abrasive, the fryer should be rinsed thoroughly.

The following non-limiting examples specifically illustrate how the composition of the invention may be used.

EXAMPLES

To evaluate the performance of the method of the invention in commercial food establishments, 21 gas-heated or electrically heated stainless steel fryers were boiled out at several fast-food restaurants in the Greensboro, N.C. area. Some fryers had been routinely used to french fry potatoes exclusively, while other fryers, designated as multipurpose fryers, had been used to cook a variety of deep fried foods. Certain fryers sold under the tradename Frymaster ™ had a deeper and narrower "hot well" area, the outside of which was directly heated by one or more gas flames. Thus, the interior of this well area was the surface most likely to be subjected to very high temperatures and most likely to be heavily soiled with the difficultly removable soil addressed by the present invention.

The above Exemplary Formulation No. 1 was employed in these boil-out tests, as was the fryer boil-out procedure outlined above. The percentage of the stainless steel surface from which the difficultly removable soil of interest was ultimately essentially chemically removed was calculated as follows:

Initial Coverage $= (A)(f_I) = C_I$
(surface area covered by soil)
where
$A$ = total surface area
and
$f_I$ = fraction of total surface area initially covered by soil Final Coverage $= (A)(f_F) = C_F$
(surface area covered by soil)
where
$f_F$ = fraction of total surface area finally covered by soil $$\% \text{ surface area cleaned} = \frac{C_I - C_F}{C_I}(100)$$

$$= \frac{(A)(f_I) - (A)(f_F)}{(A)(f_I)}(100)$$

$$= \frac{\%\text{ of total surface area initially covered} - \%\text{ of total surface area finally covered}}{\%\text{ of total surface area initially covered}}$$

TABLE I

| Location | No. Fryers Boiled Out | Use and Type of Fryer | Soil Coverage (Based on Total Surface Area) Initially | Soil Coverage (Based on Total Surface Area) After Boil-Out | Percent of Surface Area Ultimately Clean After Boil-Out |
|---|---|---|---|---|---|
| 1 | 1 | french fries (gas) | 40% | 35% (0% after 4 weeks) | 100% |
| 2 | 2 | french fries (gas) | 80% | 40% (10% after 4 weeks)[6] | 87.5% |
|   |   | multipurpose (gas) | 40% | 35% (0% after 4 weeks) | 100% |
| 3 | 2 | french fries (gas) | 95% | 60% (25% after 2 and 3 weeks) | 73.7% |
|   |   | multipurpose (gas) | 95% | 10% (10% after 2 and 3 weeks) | 89.5% |
| 4 | 2 | french fries (gas) | 70% | 20% | 71.47% |
|   |   | multipurpose (gas) | 50% | 5% | 90% |
| 5 | 2 | french fries (gas) | 95% | 40% (40% after 1 week) | 57.9% |
|   |   | multipurpose (gas) | 95% | 5% (5% after 1 week) | 94.7% |
| 6 | 2 | french fries (gas) | 70% | 5% | 93% |
|   |   | multipurpose (gas) | 70% | 10% | 85.7% |
| 7 | 4 | french fries (gas) | 90% | 25% | 72.2% |
|   |   | french fries (gas) | 20% | 1% | 95% |
|   |   | multipurpose (gas) | 95% | 1% | 98.9% |
|   |   | multipurpose (gas) | 90% | 20% (5% after 10 days) | 94.4% |
| 8 | 4 | french fries (gas) | 60% | 5% | 91.7% |
|   |   | pies (gas) | 50% | 40% (10% with scrub)[7] | 20% |
|   |   | chicken (gas) | 40% | 5% | 87.5% |
|   |   | pies (gas) | 60% | 10% | 83.3% |
| 9 | 2 | multipurpose, all-vegetable shortening (electric) |   |   | 60%[8] |

[6]The remaining soil was not removable when contacted with a corrosive cleaner comprising 10–11 weight % aqueous potassium hydroxide.
[7]The stainless steel surface of the fryer was scrubbed immediately after the boil-out process. The fryer was not subsequently observed for delayed release of soil. It was noted, however, that the residual soil remaining after the boil-out process was more easily scrubbed off down to the 10% soil coverage indicated.
[8]The restaurant manager at this test location judged the results to be equal to that obtained by employing the corrosive cleaner formula given in footnote 6.

It can be seen from Table I that a greater percentage of the difficultly removable soil of interest was removed from the stainless steel surfaces of the multipurpose fryers than of the fryers used to make french fried potatoes. However, even in the french fry fryers where residual carbon was substantial (20–60% coverage) prior to delayed release of the soil, restaurant managers were typically pleased with the results and said they compared favorably with the results previously obtained on the same fryers with previously used boil-out processes, even those using corrosive compositions. When residual carbonized food soil remained after the boil-out process, it was present primarily down in the hot well area of the Frymaster ™ fryers. Information about the fryers showing the amount of carbonized food soil present after the boil-out process with the composition of Exemplary Formulation No. 1 is summarized in Table II below.

TABLE II

|   | French Fries | Other Fryers |
|---|---|---|
| Fryers with 10% or less soil remaining immediately after boil-out and prior to any delayed release | 2 of 9 | 8 of 10 (one more started out very clean) |
| Fryers with 20–25% of soil remaining immediately after boil-out and prior to any delayed release | 4 of 9 | 1 of 10 |
| Fryers with more than 35% of soil remaining immediately after boil-out and prior to any delayed release | 2 of 9 | 1 of 10 |

Of the fryers with some difficultly removable carbonized food soils remaining after the above-described contacting step of the process, some delayed release of the soil was observed. That is, in five out of six fryers having residual carbonized food soil after boil-out at five different food establishments, at least some additional carbonized food soil detached from the stainless steel surface of the fryer subsequent to the boil-out process, for example, after fresh shortening was added and brought up to cooking temperature. The following Table III summarizes information concerning this delayed release phenomenon learned of by delayed re-observation of fryers having a substantial amount of the carbonized food soil of interest remaining after the boil-out process.

TABLE III

|  | French Fries | Other Fryers |
| --- | --- | --- |
| Fryers with very substantial delayed soil release | 2 of 4 | 2 of 2 |
| Fryers with partial delayed release of soil | 1 of 4 | 0 of 2 |
| Fryers with no delayed soil release. | 1 of 4 | 0 of 2 |

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

We claim:

1. A method for boiling out from a stainless steel fryer surface a charred, polymeric, difficultly removable soil originating from an animal or vegetable fat, fatty derivative or other organic deposit from the frying of food, comprising the steps of:
   introducing into the fryer water and a quantity of a noncorrosive chemical composition comprising an amount of an alkaline agent such that the composition has an alkaline pH, the composition further comprising a chelating or sequestering agent and a surface active agent, said quantity of the composition being effective to ultimately essentially chemically remove said soil from at least 51% of the fryer surface in a boiling out step; and
   boiling out said soil from the fryer with said water and said quantity of noncorrosive chemical composition, said soil being otherwise ultimately essentially chemically removable from at least 51% of said surface under boiling out conditions, at a temperature at which said boiling out step is conducted, only by contacting the fryer surface with at least one corrosive chemical composition.

2. A method as recited in claim 1, further comprising the step, following said boiling out step, of heating the fryer surface having remaining soil adhered thereto until a portion of the remaining soil is removed.

3. A method as recited in claim 1, wherein said soil is ultimately essentially chemically removed from at least 60% of said surface.

4. A method as recited in claim 1, wherein said soil is ultimately essentially chemically removed from at least 75% of said surface.

5. A method as recited in claim 1, wherein said chelating or sequestering agent is at least one member selected from ammonium, amine and alkali metal salts of alkylenepolyaminepolycarboxylic, nitrilotriacetic, gluconic and N-2 hydroxyethylaminodiacetic acids.

6. A method as recited in claim 5, wherein said chelating or sequestering agent is at least one member selected from ammonium, sodium and potassium salts of said acids.

7. A method as recited in claim 5, wherein said amine salt is a hydroxyalkylamine salt.

8. A method as recited in claim 5, wherein said alkylenepolyaminepolycarboxylic acid is selected from ethylenediaminetetraacetic acid, N-(hydroxyethyl)-ethylenediaminetriacetic acid, ethylenetriaminepentaacetic acid, propylene-1,2-diaminetetraacetic acid, propylene-1,3-diamine-tetraacetic acid and isomeric butylenediaminetetraacetic acids.

9. A method as recited in claim 8, wherein said alkylenepolyaminepolycarboxylic acid is ethylenediaminetetra-acetic acid.

10. A method as recited in claim 9, wherein said salt of said alkylenepolyaminepolycarboxylic acid is the tetrasodium salt of ethylenediaminetetraacetic acid.

11. A method as recited in claim 8, wherein said alkylenepolyaminepolycarboxylic acid is N-(hydroxethyl)ethylenediaminetriacetic acid.

12. A method as recited in claim 1, wherein said composition further comprises an acidic agent selected from sulfamic, maleic, sulfuric, nitric, hydrochloric, phosphoric, citric, acetic, tartaric, gluconic and hydroxyacetic acids.

13. A method as recited in claim 12, wherein said acidic agent is phosphoric acid.

14. A method as recited in claim 1, wherein said alkaline agent is at least one compound selected from alkali metal carbonates, alkali metal bicarbonates, alkali metal phosphates, alkali metal hydroxides and alkali metal silicates.

15. A method as recited in claim 14, wherein said alkaline agent is at least one compound selected from alkali metal hydroxides and alkali metal silicates.

16. A method as recited in claim 14, wherein said alkaline agent is at least one compound selected from potassium hydroxide and sodium metasilicate pentahydrate.

17. A method as recited in claim 1, wherein said surface active agent is at least one zwitterionic, cationic, anionic or nonionic surfactant.

18. A method as recited in claim 17, wherein said surface active agent is an anionic surfactant.

19. A method as recited in claim 18, wherein said anionic surfactant is at least one member selected from soaps and water-soluble salts of alkylbenzene sulfonates, alkyl sulfates, alkylpolyethoxyether sulfates, paraffin sulfonates, alpha-olefin sulfonates, alphasulfocarboxylates and their esters, alkylglycerylethersulfonates, fatty acid monoglyceride-sulfates and -sulfonates, alkylphenol-polyethoxy ethersulfates, 2-acyloxyalkane-1-sulfonates and beta-alkyloxy alkanesulfonates.

20. A method as recited in claim 18, wherein said anionic surfactant is at least one member selected from soaps having from 8 to 24 carbon atoms and water-soluble salts of (1) alkylbenzenesulfonates having from 9 to 15 carbon atoms in a linear or branched alkyl chain, (2) alkylsulfates having from 8 to 22 carbon atoms in the alkyl chain, (3) alkylpolyethoxy ethersulfates having from 10 to 18 carbon atoms in the alkyl chain and an average of from 1 to 12 —CH$_2$CH$_2$O— groups per molecule, (4) linear paraffin sulfonates having from 8 to 24 carbon atoms and (5) alpha-olefin sulfonates having from 10 to 24 carbon atoms.

21. A method as recited in claim 18, wherein said anionic surfactant is at least one member selected from soaps having from 12 to 18 carbon atoms and the water-soluble salts of (1) alkylbenzenesulfonates having from 11 to 13 carbon atoms in a linear or branched alkyl chain, (2) alkylsulfates having from 12 to 18 carbon atoms in the alkyl chain, (3) alkylpolyethoxy ethersulfates having from 10 to 16 carbon atoms in the alkyl chain and an average of from 1 to 6 —$CH_2CH_2O$— groups per molecule, (4) linear paraffin sulfonates having from 14 to 18 carbon atoms and (5) alpha-olefin sulfonates having from 14 to 16 carbon atoms.

22. A method as recited in claim 21, wherein the cation of said water-soluble salts is selected from alkali metal, alkaline earth metal, ammonium and alkanolamine cations.

23. A method as recited in claim 17, wherein said surface active agent is a nonionic surfactant.

24. A method as recited in claim 23, wherein said nonionic surfactant is at least one water-soluble polyethoxy compound produced by the condensation of ethylene oxide with a hydrophobic compound.

25. A method as recited in claim 24, wherein said hydrophobic compound is selected from alcohols and polypropoxy ethylenediamines.

26. A method as recited in claim 25, wherein said hydrophobic compound is an aliphatic alcohol, alkyl phenol or polypropoxy glycol.

27. A method as recited in claim 23, wherein said nonionic surfactant is at least one polyethoxy alcohol produced by the condensation of an average of from 1 to 30 moles of ethylene oxide with 1 mole of a branched or straight chain, primary or secondary aliphatic alcohol having from 8 to 22 carbon atoms.

28. A method as recited in claim 27, wherein said nonionic surfactant is at least one polyethoxy alcohol produced by the condensation of an average of from 1 to 6 moles of ethylene oxide with 1 mole of a branched or straight chain, primary or secondary aliphatic alcohol having from 9 to 16 carbon atoms.

29. A method as recited in claim 27, wherein said nonionic surfactant is at least one ethoxylated fatty alcohol having the formula:

$R(OCH_2CH_2)_xOH$ where R is an aliphatic hydrocarbon group having from 8 to 20 carbon atoms, and x is the average degree of ethoxylation and is a number from 1 to 10.

30. A method as recited in claim 29, wherein said nonionic surfactant is a mixture of two ethoxylated fatty alcohols, each having an R group of from 9 to 11 carbon atoms, and where the value of x in one of said ethoxylated fatty alcohols is 2.5 and the value of x in the other of said ethoxylated fatty alcohols is 6.0.

31. A method as recited in claim 17, wherein said surface active agent is a zwitterionic surfactant.

32. A method as recited in claim 31, wherein said zwitterionic surfactant is at least one compound selected from water-soluble derivatives of aliphatic quaternary ammonium, phosphonium and sulfonium cationic compounds in which the aliphatic moieties are straight or branched, and where at least one of the aliphatic moieties contains from 8 to 18 carbon atoms and at least one of the aliphatic moieties contains an anionic water-solubilizing group.

33. A method as recited in claim 32, wherein said anionic water-solubilizing group is selected from alkyldimethylpropanesulfonates and alkyldimethylammoniohydroxypropanesulfonates, and wherein the alkyl group of said sulfonates contains from 1 to 18 carbon atoms.

34. A method as recited in claim 17, wherein said surface active agent is a cationic surfactant.

35. A method as recited in claim 34, wherein said cationic surfactant is at least one quaternary ammonium compound.

36. A method as recited in claim 35, wherein said quaternary ammonium compound is a fatty alkyl quaternary ammonium compound.

37. A method as recited in claim 35, wherein said quaternary ammonium compound is cetyltrimethylammonium bromide or chloride, or distearyldimethylammonium bromide or chloride.

38. A method as recited in claim 17, wherein said composition is aqueous.

39. A method as recited in claim 38, wherein said composition further comprises at least one additive selected from perfumes and dyes.

40. A method as recited in claim 1, wherein said surface active agent is at least one surfactant selected from:
an anionic surfactant selected from soaps and water-soluble salts of the following compounds: alkylbenzene sulfonates, alkyl sulfates, alkylpolyethoxyether sulfates, paraffin sulfonates, alpha-olefin sulfonates, alpha-sulfocarboxylates and their esters, alkylglycerylethersulfonates, fatty acid monoglyceridesulfates and -sulfonates, alkylphenolpolyethoxy ethersulfates, 2-acyloxy-alkane-1-sulfonates and beta-alkyloxy alkanesulfonates;
a nonionic surfactant selected from water-soluble polyethoxy compounds produced by the condensation of ethylene oxide with a hydrophobic compound;
a zwitterionic surfactant selected from water-soluble derivatives of aliphatic quaternary ammonium, phosphonium and sulfonium cationic compounds in which the aliphatic moieties may be straight of branched, and where at least one of the aliphatic moieties contains from 8 to 18 carbon atoms and at least one of the aliphatic moieties contains an anionic water-solubilizing group; and
a cationic surfactant selected from quaternary ammonium compounds.

41. A method as recited in claim 1, wherein said alkaline agent is present in the composition in an amount up to 40 weight percent, said chelating or sequestering agent is present in the composition in an amount up to 60 weight percent, and said surface active agent is present in the composition in an amount up to 60 weight percent.

42. A method as recited in claim 1, wherein said chelating or sequestering agent is present in an amount from 0.5 to 60 weight percent based on the composition, said alkaline agent is present in an amount from 0.1 to 25 weight percent based on the composition, and said surface active agent is present in an amount from 1 to 60 weight percent based on the composition.

43. A method as recited in claim 1, wherein said chelating or sequestering agent is present in an amount from 3 to 12 weight percent based on the composition, said alkaline agent is present in an amount from 1 to 10 weight percent based on the composition, and said surface active agent is present in an amount from 3 to 15 weight percent based on the composition.

44. A method as recited in claim 43, wherein the composition further comprises from 1 to 10 weight percent based on the composition of an acidic agent.

45. A method as recited in claim 44, wherein said composition is aqueous; said chelating or sequestering agent is tetrasodium ethylenediaminetetraacetate; said surface agent is sodium xylene sulfonate and a mixture of two ethxylated fatty alcohols each having the formula:

$$R(OCH_2CH_2)_xOH$$

where R is an aliphatic hydrocarbon group having from 9 to 11 carbon atoms, and where the value of x is the average degree of ethoxylation and is, in one of said ethoxylated fatty alcohols 2.5, and in the other of said ethoxylated fatty alcohols 6.0; said acidic agent is phosphoric acid; and said alkaline agent is potassium hydroxide and sodium metasilicate pentahydrate.

46. A method as recited in claim 43, wherein said chelating or sequestering agent is tetrasodium ethylenediaminetetraacetate; said alkaline agent is tripotassium phosphate, potassium hydroxide and sodium metasilicate pentahydrate; and said surface active agent is a mixture of two ethoxylated fatty alcohols each having the formula:

$$R(OCH_2CH_2)_xOH$$

where R is an aliphatic hydrocarbon group having from about 9 to 11 carbon atoms, and where the value of x is the average degree of ethoxylation and is, in one of said ethoxylated fatty alcohols 2.5, and in the other of said ethoxylated fatty alcohols 6.0.

47. A method for boiling out from a stainless steel fryer a charred, polymeric, difficulty removable soil originating from an animal or vegetable source comprising the steps of:
   introducing into the fryer water and a quantity of a noncorrosive chemical composition comprising an amount of an acidic agent such that the composition has an acid pH, said quantity of the composition being effective to ultimately essentially chemically remove said soil from at least 51% of the fryer surface in a boiling out step; and
   boiling out said soil from the fryer with said water and said quantity of noncorrosive chemical composition, said soil being otherwise ultimately essentially chemically removable from at least 51% of said surface under boiling out conditions, at a temperature at which said boiling out step is conducted, only by contacting the fryer surface with at least one corrosive chemical composition.

48. A method as recited in claim 47, wherein said composition further comprises a chelating or sequestering agent.

49. A method as recited in claim 48, wherein said composition further comprises at least one surfactant.

50. A method for boiling out from a stainless steel fryer surface a charred, polymeric, difficulty removable soil originating from an animal or vegetable source comprising the steps of:
   introducing into the fryer water and a noncorrosive chemical composition comprising: a chelating or sequestering agent selected from ammonium, amine and alkali metal salts of alkylenepolyaminepolycarboxylic, nitrilotriacetic, gluconic and N-2 hydroxyethylaminodiacetic acids; a quantity of an alkaline agent such that the composition has an alkaline pH; and a surfactant; and
   boiling out said soil from the fryer with said water and said noncorrosive aqueous chemical composition, whereby said soil is ultimately essentially chemically removed from at least 51% of the surface of said fryer.

51. A method as recited in claim 50, wherein said chelating or sequestering agent is tetrasodium ethylenediaminetetraacetate present in the composition in an amount of 30 parts by weight; said alkaline agent is tripotassium phosphate present in the composition in an amount of 41 parts by weight, potassium hydroxide present in the composition in an amount of 1.4 parts by weight and sodium metasilicate pentahydrate present in the composition in an amount of 2.0 parts by weight; and said surfactant is a mixture of two ethoxylated fatty alcohols each present in the composition in an amount of 13 parts by weight and each having the formula:

$$R(OCH_2CH_2)_xOH$$

where R is an aliphatic hydrocarbon group having from 9 to 11 carbon atoms, and where the value of x is the average degree of ethoxylation and is, in one of said ethoxylated fatty alcohols 2.5, and in the other of said ethoxylated fatty alcohols 6.0.

where R is an aliphatic hydrocarbon group having from 9 to 11 carbon atoms, and where the value of x is the average degree of ethoxylation and is, in one of said ethoxylated fatty alcohols 2.5, and in the other of said ethoxylated fatty alcohols 6.0.

* * * * *

UNITED STATES PATENT AND TRADEMARK OFFICE
CERTIFICATE OF CORRECTION

PATENT NO. : 5,342,450
DATED : August 30, 1994
INVENTOR(S) : John R. CORRELL, Jr., et al.

It is certified that error appears in the above-indentified patent and that said Letters Patent is hereby corrected as shown below:

Claim 11 (column 16, lines 19 and 20), change "(hydroxethyl)" to --(hydroxyethyl)--.

Claim 40 (column 18, line 38), change "of" to --or--.

Claim 45 (column 19, line 5), change "ethxylated" to --ethoxylated--.

Claim 47 (column 19, line 33), change "difficulty" to --difficultly--.

Claim 50 (column 20, line 7), change "difficulty" to --difficultly--.

Claim 51 (column 20), delete lines 45 through 49 in their entirety.

Signed and Sealed this

Twenty-second Day of November, 1994

Attest:

BRUCE LEHMAN

*Attesting Officer*  *Commissioner of Patents and Trademarks*